*INVENTOR.*
EDWARD STARK
BY Richard W. Treverton
ATTORNEY

3,283,659
CUTTER AND METHOD FOR CUTTING NON-GENERATED SPIRAL BEVEL AND HYPOID GEARS

Edward Stark, Rochester, N.Y., assignor to The Gleason Works, Rochester, N.Y., a corporation of New York
Filed June 1, 1965, Ser. No. 460,169
15 Claims. (Cl. 90—5)

The present invention relates to a face mill cutter and a method for cutting non-generated spiral bevel and hypoid gears.

Usually the normal pitch of such gears changes along the length of the teeth, requiring either the teeth or the tooth slots, or both, to taper in thickness. In many designs it is necessary or at least highly desirable that the taper be divided, so that both the teeth and the slots have thickness taper. With gear designs having slots of constant depth the provision of slot thickness taper of course requires that the opposite sides of the slot be produced with the cutter axis in different positions relative to the gear. It has been known heretofore to cut such tooth slots with a cutter which makes only one revolution per tooth slot, the cutter having one group of blades for cutting the slot side, and, spaced circumferentially therefrom, a second group of blades for cutting the opposite slot side. After the cutting of one side by the first group of blades the work gear and cutter axis are relatively displaced prior to cutting of the opposite side by the second group of blades.

Cutting in this manner has had the disadvantage that the first slot side to be finished is scratched and gouged by the dragging therealong of cutting chips from the opposite side. The purpose of the present invention is to obviate or minimize this difficulty while maintaining the efficiency of the cutting operation.

In producing gears with the present invention, the tooth slot is first rough formed to provide a slot, usually of constant thickness, which closely follows the slot side surface that is to be finished last. That is, only a thin layer of stock is left for removal in finish cutting from one side of the slot, while leaving a greater amount of stock, tapering in thickness, on the other side of the slot, the side that is to be finished first. The finishing cutter has a relatively large number of blades for removing this tapering thickness of stock in successive layers, and a relatively small number of blades for removing the very thin layer of stock remaining on the opposite side of the slot.

A preferred form of cutter and method of cutting will now be described with reference to the accompanying drawings, wherein.

Figure 2:
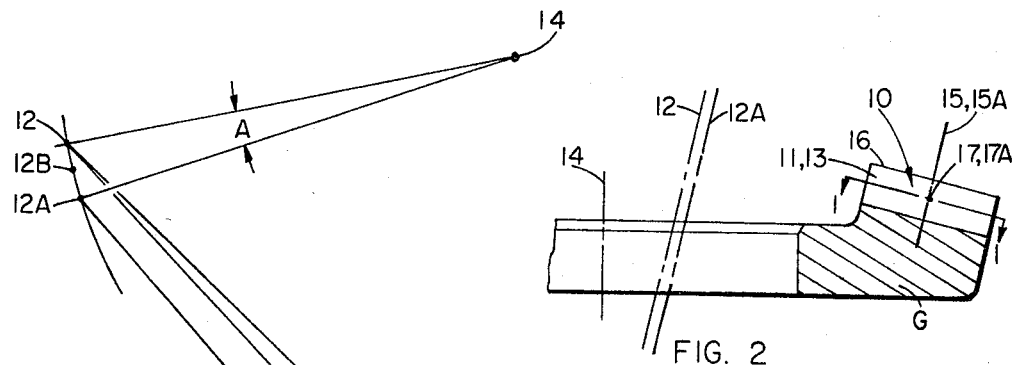
FIG. 2 is a half axial section through the gear.
Figure 1:
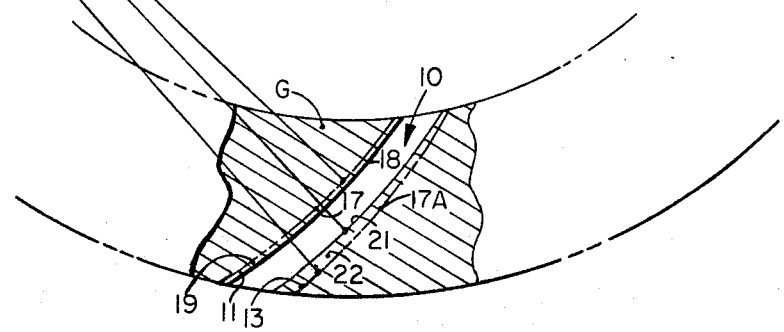
FIG. 1 is a section through a gear approximately in plane 1—1 of FIG. 2, with the rough cut sides of the tooth slot shown in full lines and the finish cut sides in broken lines.

In bevel and hypoid gears the transverse pitch of course increases with the distance from the gear axis, requiring the teeth of either or both of a mating gear and pinion to be of tapering transverse thickness. Preferably the teeth of both members taper by approximately the same amount, so that they may be of equal strength throughout their lengths. Where, as is conventional, the gear member is produced with a face mill cutter which forms both sides of a tooth slot in the same operation, the desired slot width taper is obtained by cutting the slot to tapering depth. However in gear designs having teeth of constant depth, tapering slot thickness can be obtained only by cutting one side of the slot with the cutter axis in a different position relative to the gear than when cutting the other tooth side. Referring to FIGS. 1 and 2, tapered tooth slot 10 is formed in gear G by cutting convex slot side 11 as a surface of revolution about axis 12 and by cutting concave slot side 13 as a surface of revolution about axis 12A. The effect of shifting of the cutter axis from 12 to 12A may in practice be accomplished by maintaining the axis 12 in a single position relative to the gear cutting machine and by simply indexing the gear about its rotation axis 14 through angle A (clockwise in FIG. 1).

This method of cutting is disclosed in Patent No. 2,284,636 to L. O. Carlsen, which proposes to rough and finish cut one side of a tooth slot, say side 11 of the present drawings, as a surface of revolution about axis 12, then index the gear through angle A to relatively shift the axis to 12A, and then rough and finish the opposite side 13 as a surface of revolution about axis 12A. The cutting about axis 12A involves the removal of a tapering layer of stock of considerable thickness, producing chips which damage the previously finished surface 11.

It has also been proposed heretofore to rough out the tooth slots in one operation, by means of a roughing cutter rotating about axis 12B, FIG. 1, which leaves on both surfaces 11 and 13 tapering layers of stock to be removed in a separate finishing operation. This latter operation, effected with a cutter having blades arranged substantially as shown in Patent No. 2,126,262 to M. H. Johanson, involved the cutting of surface 13 by one-half revolution of the cutter about axis 12A, and then, after relative indexing between the gear and the cutter axis, cutting the surface 11 by a further half revolution of the cutter about axis 12. Here too the chips produced in the last finish cutting, of surface 11, damaged the previously finished surface, 13.

The present invention preferably is practiced by first cutting each tooth slot of the gear with a roughing cutter rotating about axis 12, with that axis parallel to a line 15, FIG. 2, that is normal to face cone 16 of the gear and passes through mean point 17 of finished tooth side 11. This produces a roughed out convex slot side 18, FIG. 1, which conforms closely in shape to the desired finished surface 11, leaving only a thin layer of stock 19 of uniform thickness to be removed in finish cutting. It also produces roughed out concave slot side 21, leaving a tapering layer of stock 22 of greater thickness to be removed in finishing to surface 13.

Figure 4:
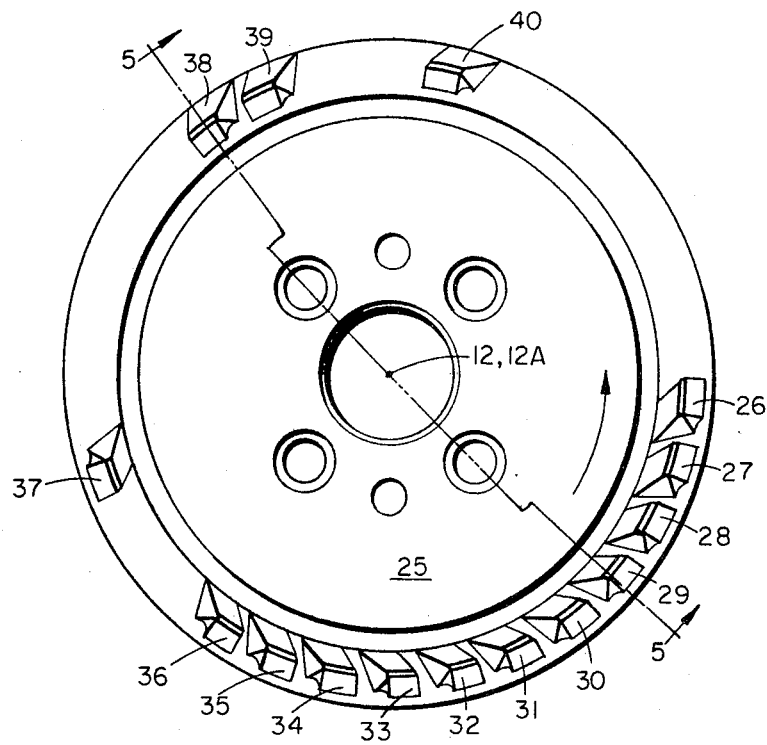
FIG. 4 is a face view and FIG. 5 an axial sectional view of the cutter in planes 5—5 of FIG. 4; and, FIG. 6 is a diagram in a cutter axial plane, showing the relative axial and radial positions of the several cutting edges of the cutter.
Figure 5:
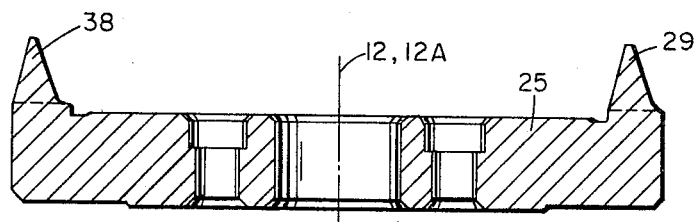
Figure 6:
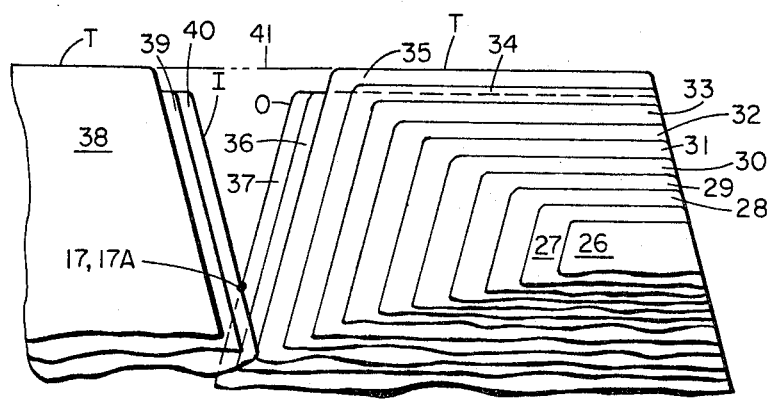

Finishing is preferably practiced with a cutter as shown in FIGS. 4, 5 and 6, which first, while rotating about axis 12A, FIG. 1, cuts away the tapering layer of stock 22, producing finished surface 13, and then, after relative indexing between the gear and cutter through angle A about gear axis 14, continues its rotation about axis 12 to cut away layer of stock 19, producing finished surface 11.

Figure 3:
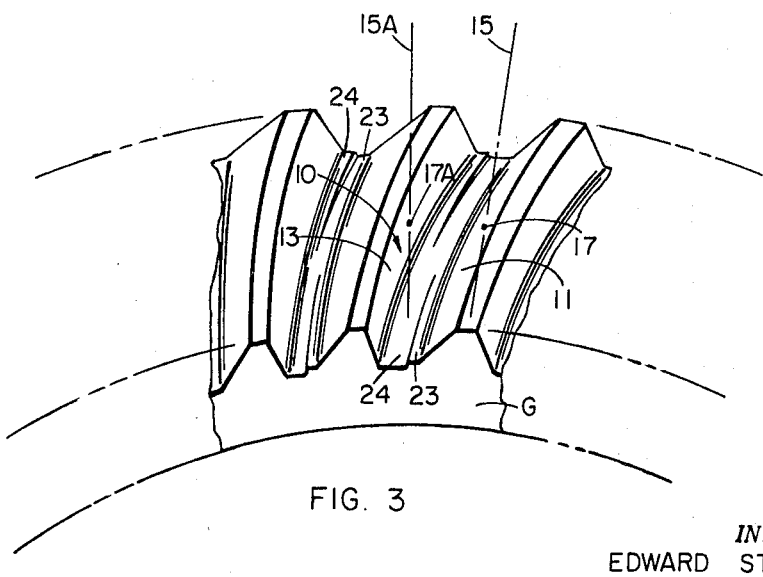
FIG. 3 is a fragmentary perspective view of the finished cut gear.

Indexing of the work gear by one-half pitch about its axis, to shift axis 12 to position 12A in FIG. 1, results in relative displacement of face cone normal 15, FIG. 3, to the position indicated at 15A, where it intersects mean point 17A of side 13. As shown, lines 15 and 15A are divergent. Since cutter axes 12 and 12A are parallel to lines 15 and 15A, and the tips of the cutter blades rotate in planes perpenciular to them, the portion of the slot bottoms 23 and 24, if respectively cut in the same cutter-gear relationship as sides 11 and 13, also diverge. The result is that when the portions 23 and 24 are at the same depth at the middle of the slot, portion 23 will be slightly deeper than portion 24 at the heel or wide end of the slot, and slightly shallower at the toe or narrow end. Another result of the normals 15 and 15A (which are parallel to axes 12 and 12A) passing through the means points 17 and 17A is that the pressure angles of the gear teeth correspond to the cutter blade angles. This is in contrast with the usual form cutting method where the corresponding normals pass through a midpoint of the tooth slot, i.e., through a point midway between points 17 and 17A, and where the blade angles therefore differ somewhat from the tooth pressure angles.

Referring to FIGS. 4 to 6 the cutter has two groups of blades extending axially from the body 25 thereof. One group, for cutting away the relatively thick and tapering stock layer 22, FIG. 1, consists of ten outside cutting roughing blades, 26 to 35, semi-finishing blade 36, and finishing blade 37. The other group, for removing the thin and uniform layer of stock 19, consists of only three inside cutting blades, these being protection blade 38, semi-finishing blade 39 and finishing blade 40. The radial and axial relation of these blades is as shown in FIG. 6, wherein the cutting edges of all blades appear as though rotated into the same plane containing the cutter axis, and with line 41 representing the plane of rotation of the deepest cutting blades, 35 and 38.

The particular cutter shown is of thirty index, i.e. the cutting edges of successive blades are spaced at angular intervals of twelve degrees or a multiple thereof around the cutter. As shown, the spacing of blades 26 to 36 and of blades 38 and 39 is one pitch. That of blades 36 and 37 and of blades 39 and 40 is three pitch (thirty-six degrees) which is slightly greater than the face width of the gear so that finishing by blades 37 and 40 is done with no other blade in the cut. The spacing of blades 26 and 40 is seven pitch and that of blades 37 and 38 six pitch, which, with conventional gear cutting machines, provides ample gaps for indexing of the work without relative withdrawal of the cutter. The gap 26–40 is slightly greater than gap 37–38 because after the last tooth slot has been cut, it is when this gap is abreast of the work that the machine must stop to recive a fresh workpiece and then be restarted. Although the index angle is usually exactly one-half pitch of the work gear, if desired the tooth thickness may be varied by making successive indexes slightly more or slightly less than one-half pitch. It is only necessary, of course, that the sum of two successive indexes equal exactly one pitch. Because of the assymetrical arrangement of the index gaps around the cutter's circumference, it is necessary that the indexing actions be correspondingly assymetrically related to cutter rotation. While the particular cutter shown is of the solid type, its blades being integral with the cutter body, it will be understood that if desired it may be made of the inserted blade or the segmental blade type.

In the illustrated example, where both sides of the tooth slot are desired to have the same lengthwise curvature, the finish cutting blades 37 and 40 are at the same radial distance from the cutter axis at the points along their edges which cut the mean points 17 and 17A of the tooth sides. In the example, which is a cutter for gears of about 5.6 pitch (4.5 module) and having a mean blade circle diameter of about 4.5 inches, the inside cutting edges of blades 39 and 38 are radially outset from the designated I, of blade 40 by steps on the order of 0.001 to 0.0015 inch; and the outside cutting edges of blades 35 and 36 are radially inset by similar steps from the side edge O of blade 37. The outside edges of blades 34 to 32 are inset by steps of 0.003 inch and those of blades 31 to 26 by steps of 0.004 inch. The tip cutting edges T of blades 35 and 38 are axially outset 0.0015 inch beyond the tip edges of blades 36, 37, 39 and 40. Accordingly there can be no tip cutting by these semi-finishing and finishing blades. The tip edges of roughing blades 34 to 26 are axially inset by steps of about 0.001 inch from edges T.

The rough cutting is preferably so conducted that the tip edges of the finishing cutter are required to remove a minimum of stock. That is, the edge T of the inside blades cuts bottom portion 23 only to the same depth or to a very slightly lesser depth than the roughing cutter. The tip edges of the outside blades (except blades 36 and 37) are of course required to remove stock from the slot bottom beneath the tapering thickness layer 22 which remains after roughing. For the reason previously explained the bottom portion 24 cut by the tips of the outside blades are slightly shallower than bottom portion 23 at the heel of the slot and slightly deeper at the toe. The stock division of the gear preceding finish cutting preferably is such that the side cutting edge of inside blade 38 does not cut but merely skims along the roughed surface 18, FIG. 1. It has been found that wing-shaped chips, such as result when both side and tip edges cut, are less likely to curl tightly and more likely to produce scratches than thin flat chips. Hence the cutter is designed so that only the side edges of inside blades 39 and 40 cut and preferably the blade 38 serves for protection only. However, should the blade 38 take a slight side cut, then due to the outside blades having cut the slot bottom deeper at the toe, a wing-shaped chip produced by blade 38 is possible only at the heel of the slot, and hence, with the cutter blades passing from the narrow to the wide end of the slot, has minimum opportunity to scratch the previously finished surface 13. Should a cutter be desired for cutting in the opposite direction, it may be preferred, for these reasons, to leave the wedge shaped stock (corresponding to 22) on the convex side of the slot, and to finish cut this side first. The production of wing-shaped chips by blades 26 to 35 is harmless inasmuch as any resulting scratches of surface 18 are eliminated by the subsequent removal of layer 19, FIG. 1.

Having now described the preferred method and cutter of my invention, what I claim is:

1. The method of producing a non-generated spiral bevel or hypoid gear with tooth slots of tapering width which comprises forming the slots so that the opposite sides of each are surfaces of revolution about a first axis and then finish cutting by first cutting one side of the slot as a surface of revolution about an axis which, relative to the gear, is displaced relative to the first axis to affect taper of the slot in width, and then cutting the other side of the slot as a surface revolution about said first axis.

2. The method of claim 1 in which the relative displacement is about the axis of the gear.

3. The method of claim 2 in which the cutter axis is substantially parallel to a line which is normal to the face cone of the gear and extends through a mean point of the tooth side being cut.

4. The method of claim 1 in which the finish cutting of both sides of each tooth slot is effected in a single revolution of a face mill cutter having a first group of blades for cutting said one side of the slot and a second group of blades for cutting the other side of the slot, with indexing gaps separating said groups, and indexing the gear by approximately one-half pitch when the gap following each group comes abreast of the gear, the indexing between the cutting of said one side and said other side of the slot constituting the relative displacement.

5. The method of claim 4 in which the indexing is so coordinated with cutter rotation that the indexing following the cutting by said first group of blades is effected when the cutter has rotated substantially more than one-half turn beyond the rotational position thereof in which the next preceding indexing had been effected.

6. The method of claim 4 in which successive slices of stock are removed from the tooth sides by the successive blades of each group and the last blade of each group is protected by a preceding blade against engagement with the bottom of the slot.

7. The method of claim 1 in which said axes are so related to the gear that the slots are of approximately the same mean depth at both ends thereof, and the displacement is such as to provide increasing slot width from the inner to the outer ends of the slots.

8. A face mill cutter for gears having therearound two groups of blades projecting axially from the cutter body, said groups being separated by two indexing gaps, all blades of each group being formed for cutting on one side only, one group being inside cutting and its successive side cutting edges being progressively inset radially, the other group being outside cutting and its successive side cutting edges being progressively outset radially, and one group having a substantially greater number of blades and a substantially greater angular extent about the cutter rotation axis that the other group.

9. A cutter according to claim 8 in which the last blades of one group have the same angular spacing about the cutter axis as the several blades which constitute the other group, the angle from the last blade of said one group to the last blade of said other group, measured in the direction of cutter rotation, being substantially greater than 180°.

10. A cutter according to claim 8 in which the points along the side cutting edges of the last blade of both groups at substantially mid-tooth height are at the same distance from the cutter roation axis.

11. A cutter according to claim 8 in which the tip edges of the last blade of both groups lie in substantially the same plane of cutter rotation and are axially inset from the tip edges of preceding blades.

12. A face mill cutter for gears having therearound two groups of blades projecting axially from the cutter body, said groups being separated by two indexing gaps, all blades of each group being formed for cutting on one side only, one group being inside cutting and its successive side cutting edges being progressively inset radially, the other group being outside cutting and its successive side cutting edges being progressively outset radially, the points along the side cutting edges of the last blades of both broups at substantially mid-tooth height are at the same distance from the cutter rotation axis, the tip edges of the last blade of both groups lie in substantially the same plane of cutter rotation and are axially inset from the tip edges of preceding blades, and one group having a greater number of blades and a greater angular extent around the cutter rotation axis than the other group.

13. The method of producing a non-generated spiral bevel or hypoid gear with tooth slots of tapering width which comprises forming the slots so that the opposite sides of each are surfaces of revolution about a first axis and then finish cutting by first cutting one side of the slot as a surface of revolution about an axis which, relative to the gear, is displaced relative to the first axis to affect taper of the slot in width, and then cutting the other side of the slot as a surface of revolution about said first axis, the finish cutting of both sides of the slot being effected in a single revolution of a face mill cutter having a first group of blades for cutting said one side of the slot and a second group of blades for cutting the other side of the slot, with indexing gaps separating said groups, successive slices of stock being removed from the tooth sides by the successive blades of each group, with more slices being taken by the blades of the first group than by the blades of the second group and the last blade of each group being protected by a preceding blade against engagement with the bottom of the slot, the gear being indexed by approximately one-half pitch when each gap comes abreast of the gear, the indexing between the cutting of said one side and said other side of the slot constituting said relative displacement and occurring when the cutter has rotated substantially more than one-half turn beyond the position thereof in which the next preceding indexing had been effected.

14. The method of producing a non-generated spiral bevel or hypoid gear with tooth slots of tapering width which comprises forming the slots so that the opposite sides of each are surfaces of revolution about a first axis and then finish cutting by first cutting one side of the slot as a surface of revolution about an axis which, relative to the gear, is displaced relative to the first axis to affect taper of the slot in width, and then cutting the other side of the slot as a surface of revolution about said first axis, the finish cutting of both sides of the slot being effected in a single revolution of a face mill cutter having a first group of blades for cutting said one side of the slot and a second group of blades for cutting the other side of the slot, with indexing gaps separating said groups, and indexing the gear by approximately one-half pitch when each gap comes abreast of the gear, the indexing between the cutting of said one side and said other side of the slot constituting said relative displacement, the arrangement of blades in the cutter and the direction of cutter rotation being such that said first group cuts deeper than the second group into the bottom of the slot at the end of the slot at which the blades enter and that the second group cuts deeper than the first group into the bottom of the slot at the end of the slot from which the blades depart.

15. The method of claim 14 in which the direction of cutter rotation is such that the blades pass from the narrow to the wide end of the slot, and the second group of blades consists of the inside cutting blades.

References Cited by the Examiner
UNITED STATES PATENTS 2,126,262   8/1938   Johanson _____ 90—9.4

WILLIAM W. DYER, Jr., *Primary Examiner.*

G. A. DOST, *Assistant Examiner.*